July 19, 1949.  J. I. CHAPPELL  2,476,697
AUXILIARY NOSE PAD FOR SPECTACLES
Filed July 15, 1946

INVENTOR
J. I. CHAPPELL
By J. H. G. Cook
ATTORNEY

Patented July 19, 1949

2,476,697

UNITED STATES PATENT OFFICE 2,476,697

AUXILIARY NOSE PAD FOR SPECTACLES

Jesse I. Chappell, St. Louis, Mo.

Application July 15, 1946, Serial No. 683,668

1 Claim. (Cl. 88—48)

This invention relates to nose pads for spectacles, and is particularly adapted for use on spectacle frames made of plastic or the like, the particular object of the invention being to produce a nose pad which will make it possible to fit spectacles accurately to people who, by reason of unusual facial characteristics or measurements, have not previously been well fitted.

As is well known to opticians and others who are concerned with the fitting of spectacles, it is extremely difficult to fit a person the bridge of whose nose is not well developed with spectacles that will be comfortable and rest firmly in proper position, and in some cases, where the bridge of the nose is entirely undeveloped, it becomes a serious problem to fit such persons with spectacles, for the reason that the undeveloped nosebridge gives no support to the spectacle frame, which consequently comes too close to the eyes and sometimes rests against the cheeks of the wearer, or contacts his eyelashes. Through the use of my invention this discomfort is entirely avoided, because the spectacles are supported in such a way as to bring them the proper distance away from the face. Another advantage of the invention is that it may be applied to a plastic spectacle frame of any style, shape, or color, and securely attached thereto with the minimum amount of effort and at small cost.

In the drawings—

While I have illustrated the device as applied to a spectacle frame, such frame does not form any part of the present invention and will therefore not be described.

Figure 1:
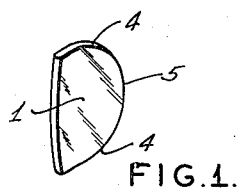
Fig. 1 is a perspective view of my nose pad as it appears before attachment to a spectacle frame.
Figure 2:
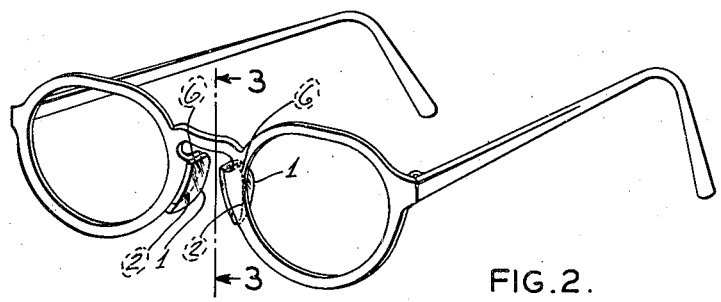
Fig. 2 is a perspective view illustrating a spectacle frame with a pair of my nose pads in operative position thereon.

The invention consists of a nose pad 1 formed of plastic or any equivalent easily fusible material, so shaped as to conform substantially to the shape of the noseguard of the ordinary plastic spectacle frame; that is to say, the nose pad 1 is of approximately the same height as the noseguard 2 to which it is to be attached, but the width of the nose pad 1 is greater than the width of the noseguard 2, and whereas the noseguard 2 ordinarily is reduced in width at its lower portion, as at 3, the nose pad is the same width at top and bottom, as at 4, and at the side nearest the face of the wearer the edge of said nose pad 1 is curved, as at 5, to conform to the shape of the wearer's face where his nose is adjacent his eye socket. Thus, as indicated most clearly in Fig. 2, the nose pad 1 extends inwardly, toward the face of the wearer, a greater distance than does the noseguard 2 of the spectacle frame, for a reason to be hereinafter set forth.

Figure 3:
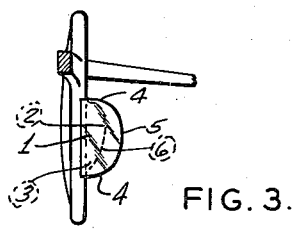
Fig. 3 is an enlarged view taken on line 3—3, Fig. 2, illustrating the nose pad in position on the noseguard of a spectacle frame.

When the pad is to be applied to the noseguard of a spectacle frame, it is fused to that side of the noseguard which contacts the nose of the wearer, with the forward edge of the pad 1 flush with the forward edge of the noseguard 2, as shown most clearly in Fig. 3. By reason of its greater width, the pad 1 extends inwardly a greater distance than the noseguard 2 (Figs. 2 and 3), so that when the spectacle frame is adjusted to the face of the wearer the curved edge 5 of the pad 1 will rest against his face where the nose and eye socket join. This will bring the spectacle frame and lenses farther away from his face than would be the case without the use of the nose pad 1, for without said pad the curved edge 6 of the comparatively narrow nose guard 1 would rest against the face. This will be most clearly understood by noting Fig. 2. It is obvious, therefore, that through the use of this invention a more accurate and comfortable fitting of the spectacle frame is accomplished, bringing the frame and consequently the lenses to the correct distance away from the wearer's eyes and face and insure a correct fitting without the necessity of cutting away any portion of the nose pad.

It is understood, of course, that nose pads 1 are to be used in pairs, a pad on each side of the nose guard.

Figure 4:
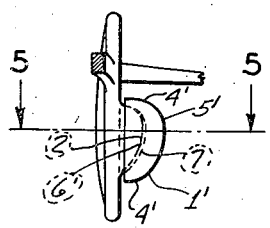
Fig. 4 is a view illustrating a modified form of the invention in position on the noseguard of a spectacle frame.
Figure 5:
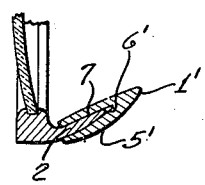
Fig. 5 is a view taken on line 5—5, Fig. 4.

The modification of the invention illustrated in Figs. 4 and 5 is of the same size and shape as the preferred form, consisting of a nose pad 1' which is of the same width at top and bottom, as shown at 4', and is curved at the side nearest the face of the wearer, as shown at 5'. The pad 1' of the modification is provided at its forward edge 6' with a slot 7 of such dimensions as to fit snugly over the noseguard 2 of the spectacle frame (Fig. 5).

In use this form of the invention is applied to the noseguard by inserting the noseguard 2 into the slot 7 of the pad 1', and fusing it in this position. It will be easily understood that by reason of the width of the pad 1' being greater than that of the noseguard 2, it will accomplish the same result as in the preferred form of the invention; that is to say, it will bring the spectacle frame and the lenses to the correct distance away from wearer's face. Naturally, as in the case of the preferred form, the nose pads 1 are to be used in pairs, one on each side of the noseguard.

I claim:

In combination with a spectacle frame having a bridge and nose pads on each side thereof, an auxiliary nose pad fusibly attached to the inner surface of each of the nose pads of said frame, said auxiliary nose pads being of greater width than the nose pads of said frame and having each a substantially straight outer edge and a curved inner edge, said auxiliary nose pads having their curved edges extending inwardly for engagement with the face of the wearer to thereby increase the distance between the frame and the face, whereby to permit correct fitting of spectacle frames on the bridge of an undeveloped nose.

JESSE I. CHAPPELL.

REFERENCES CITED

The following references are of record in the file of this patent:

UNITED STATES PATENTS

| Number | Name | Date |
| --- | --- | --- |
| 1,560,717 | Noble | Nov. 10, 1925 |
| 1,981,432 | Searles | Nov. 20, 1934 |
| 2,029,470 | Durgin | Feb. 4, 1936 |
| 2,267,997 | Spray | Dec. 30, 1941 |